June 21, 1966 L. MOORE 3,257,644

ENCODING SYSTEM AND METHOD

Filed July 9, 1962 2 Sheets-Sheet 1

INVENTOR.
LAURENCE MOORE
BY Harvey G. Lambert
ATTORNEY

INVENTOR.
LAURENCE MOORE
BY Harvey G. Lowhurst
ATTORNEY 3,257,644

ENCODING SYSTEM AND METHOD

Laurence Moore, Menlo Park, Calif., assignor to Moore Associates, Inc., San Carlos, Calif., a corporation of California Filed July 9, 1962, Ser. No. 208,210
11 Claims. (Cl. 340—152)

Figure 1:
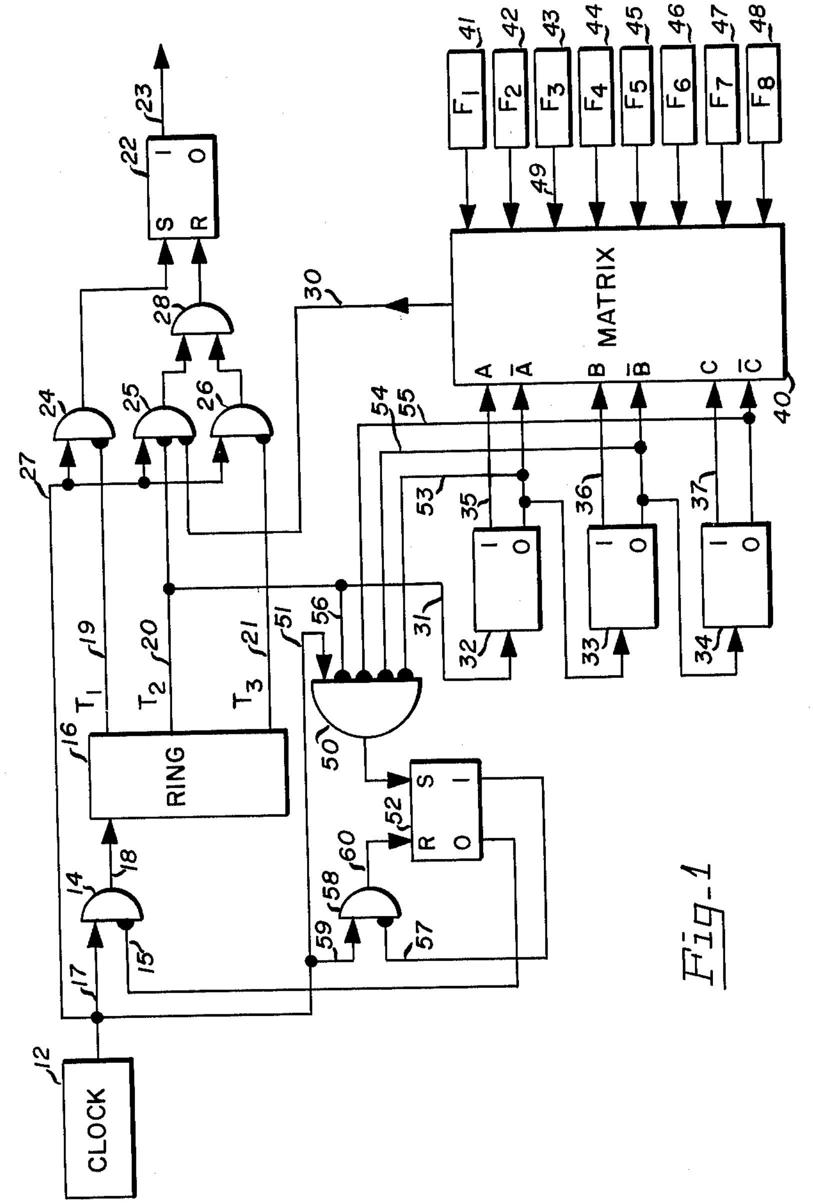

This invention relates to encoding systems and methods, and more particularly to a time-division multiplex encoding system and method for continuously, rapidly and sequentially encoding the condition of a set of binary functions to provide a pulse train indicating the binary condition of each binary function.

The present application is a continuation in part of my copending application, Serial No. 862,955, filed September 30, 1959, and titled Digital Telemetering System, which issued on April 30, 1963 as U.S. Letters Patent 3,088,098, and Serial No. 138,114, filed September 14, 1961 and titled Digital Monitoring System.

The digital systems disclosed in the above referred to copending applications comprise, briefly, a coding station, a suitable communication link, and a decoding station. The encoding station sequentially interrogates or monitors a set of functions, encodes their digital condition to form a pulse train and emits this coded pulse train. The coded pulse train provides a pulse which is one-third on and two-thirds off for one binary condition and two-thirds on and one-third off for the other binary condition, thereby reflecting the condition of each monitored function. The duration of each pulse is referred to as a period and each period is associated with a function. After each function has been interrogated or monitored, a pulse train having a length equal to the number of functions interrogated times the period is obtained. The length of this pulse train is referred to as a frame or cycle and the end of a cycle is also suitably encoded upon the pulse train for synchronization purposes.

The coded pulse train may be transmitted over a suitable communication link such as telephone lines or VHF or microwave radio to the decoding station. The decoding station decodes the coded pulse train and applies the decoded information to a suitable utilization or alarm system capable of providing an indication of the condition of each of the monitored functions.

This invention provides an improvement in the time-division multiplex encoding system of the above referred to copending application and may be used in connection with the digital systems described therein as well as other systems suitable for use with time-division multiplex codes.

The encoding systems in the above referred to copending applications utilize a clock as the basic timing system which provides output pulses which are on for two-thirds of a period and off for one-third of a period. These clock pulses are applied to a bistable output multivibrator which thereby follows the clock. The output signal of this multivibrator is the output pulse train which is transmitted, via the communication link, to the decoding station. The clock pulses are also applied to a binary counter means whose high and low output terminals are connected to one side of a coding matrix in the conventional manner. The functions to be monitored are applied to the other side of the coding matrix in such a manner that each function is sequentially connected to a common output line as the counter means advances.

As long as all functions are in one of their binary conditions no operative output signal is provided on the common output line and the output pulse train from the multivibrator remains symmetric. When one of the functions changes its condition, the output signal on the common line becomes operative to open a gate circuit permitting a clock pulse to pass therethrough and to actuate a delay circuit to provide a delay of one-third of the clock pulse. The delayed clock pulse is coupled to the reset terminal of the bistable output multivibrator to trigger the same one-third of a clock pulse period earlier than would have been the case if the off-going edge of this clock pulse had triggered the output multivibrator. In this manner the unsymmetrical pulse is provided to indicate the binary condition of the monitored functions.

Even though the encoding system described in the copending applications is eminently suitable for time-division multiplex encoding of a plurality of functions, the present invention has a number of advantages thereover. For example, one of the limitations in the encoding systems described in my copending application is the necessity of changing the delay circuit when the basic clock period is changed so that the codes generated are exactly in the one-third to two-third ratio. In other words, the delay network must at all times be synchronized with the clock. Further, for slow coding rates slow clocks must be utilized which are rather bulky in construction since their period must be equal to the period of interrogating the functions.

It is therefore a primary object of this invention to provide an improved time-division multiplex encoding system to sequentially monitor the binary condition of a plurality of functions.

It is another primary object of this invention to provide an improved method for time-division multiplex encoding the binary condition of a plurality of functions.

It is still another object of this invention to provide a simple, economical and reliable system and method for sequentially interrogating a plurality of functions and for encoding their binary condition upon a pulse train in such a manner that for one binary condition the coded pulse is exactly one-third on and two-thirds off and for the other binary condition the coded pulse is exactly two-thirds on and one-third off.

It is a further object of this invention to provide a new and novel time-division multiplex encoding system and method in which the condition of a plurality of functions are sequentially and cyclically interrogated and encode upon a pulse train having a period associated with each function interrogated and a cycle associated with each sequential completion of interrogation. The pulse within a period being indicative of the condition of the function and the pulse at the end of a cycle being indicative of the start of a new sequence.

It is still another object of this invention to provide a time-division multiplex encoding system and method utilizing a timing reference pulse having at least 3 bits per period, one bit to indicate the start of a period, one bit to indicate the end of a period, and one bit for each condition of a function other than a selected condition. More particularly for a binary function a three-bit timing reference is utilized and for a trinary function a four-bit timing reference is utilized.

It is still a further object of this invention to provide a time-division multiplex encoding system and method utilizing but a single time reference which generates the desired code for the largest possible discrimination between conditions with the return-to-zero constant rate code for a given bandwidth.

In accordance with one embodiment of the present invention, a single clock generating three bits per period is utilized as the basic and sole timing reference for encoding binary conditions. The clock bits or pulses are applied to a tristable multivibrator through a cycle gate which closes for one bit period at the end of a completed sequence of interrogating the plurality of functions to provide a cycle indicating pulse for synchronization purposes.

The cycle gate clock pulses advance the tristable multivibrator (which is a ring-of-3) to generate three output signals each having a pulse period which is on for one-third and which is off for two-thirds of the period. Only one of the pulses of the three output signals is on at any instant of time. One of the output signals (preferably the second one) is used to interrogate the plurality of functions through a conventional counting circuit and matrix network which has an output lead which is sequentially commutated to each function. The output lead provides an indication of the condition of the function, referred to as the condition signal. Also, the counting circuit provides the cycle signal used to gate the clock pulse to indicate the end of a cycle.

The first output signal is used to gate the clock pulses which are applied to the set terminal of a bistable output device to indicate the start of a period. The second output signal and the condition signal are used to gate the clock pulses which are applied to the reset terminal of the output device so that for one condition of the function the output device is reset at the end of the first-third of the period. The third output signal is used to gate the clock pulse which are also applied to the reset terminal of the output device so that the output device is reset in case the condition of the interrogated function was such that it remained in the set state.

Figure 2:
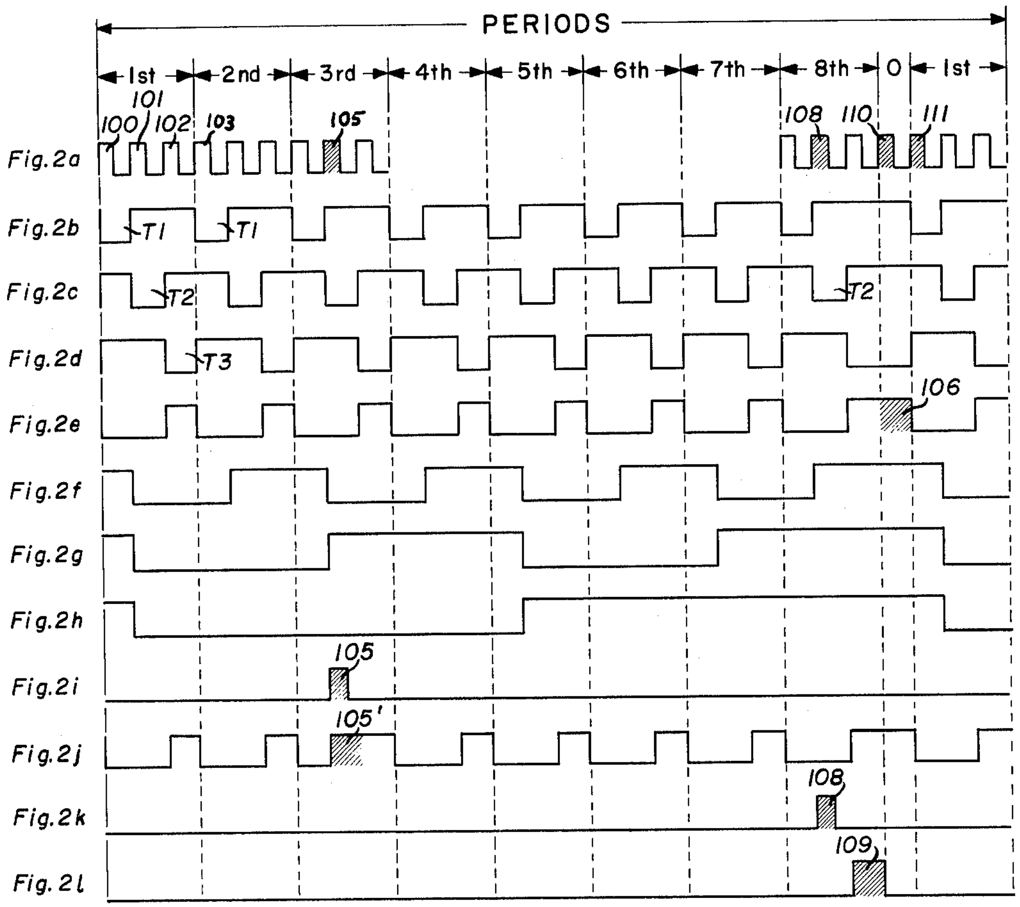

Other objects and a better understanding of the invention may be had by reference to the following description, taken in conjunction with the accompanying drawings, in which:

FIG. 1 is a schematic block diagram of the encoding system and method of this invention; and FIG. 2 is a series of timing diagrams illustrating the wave forms of the electrical signals of different points of the block diagram of FIG. 1.

Referring now to the drawings, there is shown in FIG. 1 the encoding system of this invention useful for encoding the binary conditions of eight functions to generate a coded pulse train having eight periods. The number of functions which may be associated with a particular encoding station is arbitrary and may be quite large. Since the encoding method utilized in this invention employs time-division multiplex techniques, one limit of the actual number of functions which may be encoded is the desired cycling or repetition rate of any single function. The larger the number of functions to be encoded, the greater is the time interval or cycle between successive interrogaiton of the same function if the time interval allotted to each function remains the same.

A further consideration of the number of functions which may be associated with an encoding station is economy for a given rate. Binary coding matrices can handle the coding of $2^n$ functions where $n$ is an integer which also determines the cycling rate. Accordingly, the greatest economy is achieved, in relation to the equipment utilized, by associating two, four, eight, sixteen, thirty-two, etc., functions with a given encoder.

The basic timing reference for the encoder of this invention is provided by a clock 12 which may comprise a free running multivibrator also referred to as an astable multivibrator. Clock 12 operates in a manner similar to an oscillator, generating a continuous pulse train of pulses under the influence of applied D.C. power only, as shown in FIG. 2*a*. The positive and negative half cycles of the clock output, as best seen in FIG. 2*a*, are preferably, but not necessarily, of equal duration and three pulses or bits, such as pulses 100, 101 and 102, define a single period of the coded output pulse train.

It is to be noted that since the bit or pulse rate of clock 12 is three times as great as the desired period of the output pulses of the coded pulse train, clock 12 may be constructed of smaller components than a clock providing an output pulse at the bit rate. In other words, for a given period of the coded pulse of the output pulse train, a physically smaller and less expensive clock may be utilized in practicing the instant invention. It is also to be noted that clock 12 comprises the only time reference of the coding system of this invention and all other components utilized are controlled thereby.

The clock pulses from clock 12 are gated by a gating circuit 14 which is operated by a cycle gating signal appearing on lead 15. Gate circuit 14, as well as the other gate circuits to be described hereinafter, may be of conventional construction and are used to control the passage of pulses therethrough. The convention adopted in FIG. 1, in connection with the various gate circuits, is to show an arrow at the lead which applies the "set" pulses to the gate circuit and a dot at the lead which applies the gating signal to open and close the gate. Accordingly, if gate circuit 14 is selected as the type usually referred to as a negative enabling gate circuit, the presence of a positive signal on gating lead 15 closes the gate circuit thereby preventing the clock pulses on lead 17 from passing therethrough. Conversely when the gating signal on gating lead 15 becomes negative, clock pulses on lead 17 are permitted to freely pass through gate circuit 14.

The cycle gated clock pulses are applied to a tristable counter 16 which may comprise three transistor switches cross connected so that when one is switched to a certain state the other two transistors are switched to the opposite state. More particularly, device 16 is a sequential counter with a single input lead 18 and with internal gating arranged in such a way that successive input pulses set different stages. Device 16 has three output leads 19, 20, and 21 to provide three different output signals which are so arranged that when one output is negative the other two output signals are positive. Accordingly, each output signal comprises a pulse which is on for one-third of a period and off for two-thirds of a period.

The on portion of output pulses from trinary counter 16 are respectively designated as T1, T2 and T3. The wave forms associated with the output signals on output leads 19, 20 and 21 are respectively shown in FIGS. 2*b*, 2*c* and 2*d*. The operation of device 16 is readily explained in connection with FIG. 2. The positive going edge of clock pulse 100 triggers negative going output pulse T1. The positive going edge of clock pulse 101 advances tristable counter 16 initiating negative going pulse T2 and thereby turning off output pulse T1. The positive going edge of clock pulse 102 in likewise manner advances counter 16 thereby generating a negative going output pulse T3 and shutting off output pulse T2. Clock pulse 103 repeats the sequence by initiating the next negative going output pulse T1 which denotes the start of a new period.

Output pulses T1, T2 and T3 are utilized to operate gating circuits 24, 25 and 26. More particularly, output lead 19 forms the gating lead of gate circuit 24, output lead 20 forms the gating lead of the gate circuit 25 and output lead 21 forms the gating lead of a gate circuit 26. Gates 24, 25 and 26 may be, in all respects, similar to gate circuit 14 and are so constructed that when a negative voltage is applied to their gating lead the gate circuits open to permit the transmission of a set pulse therethrough. Also applied to gating circuits 24, 25 and 26 are the clock pulses from clock 12 via set lead 27. It is to be noted that gate circuit 25 is a triple gate having an additional gating lead 30 whose operation will be explained hereinafter.

An output device 22 for generating the coded output pulse train on output lead 23 may be of the form of a bistable multivibrator having two stable states and two input terminals respectively designated as S and R. When a positive pulse is applied to the S terminal, output lead 23 will be negative, and when a positive going pulse is applied to the R terminal output lead 23 will be positive (or vice versa). Gating circuit 24 is directly connected to the S terminal of output multivibrator 22 and gating circuits 25 and 26 are connected, through an OR gate 28, to the R terminal multivibrator 22.

In operation negative pulse T1 opens gating circuit 24 so that clock pulse 100 (see FIG. 2) applied via lead 27, passes therethrough to set output multivibrator 22 resulting in a negative going pulse on output lead 23. In this manner, output device 22 is set by a clock pulse gated by the output signal on lead 19. Since, during this time pulse T1 is negative, both pulses T2 and T3 are positive, gating circuits 25 and 26 remain closed, and pulse 100 does not pass therethrough. At the time of occurrence of the next clock pulse 101, T1 goes positive, thereby closing gating circuit 24, pulse T3 remains positive so that gating circuit 26 remains closed, but output pulse T2 becomes negative.

As will be explained hereinafter, gate circuit 25 is controlled by an additional gating lead 30 whose function will be explained hereinafter. Preliminarily, let it be assumed that gating lead 30 remains positive indicating that the condition of the function interrogated is in a preselected state. Accordingly, gating circuit 25 remains closed preventing clock pulse 101 from passing therethrough and resetting output device 22. Consequently, output lead 23 remains negative during the second one-third period.

At the instant of the occurrence of clock pulse 102, which triggers output pulse T3, both output pulses T1 and T2 become positive so that gate circuits 24 and 25 are closed. However, gate circuit 26 is opened by pulse T3 so that clock pulse 103 from lead 27 passes through gate circuit 26 and through OR gate 28 to the R terminal of bistable output multivibrator 22 to reset the same. Accordingly, output lead 23 goes positive during the third one-third period.

Clock pulse 103 thereafter starts the recycling process of counter 16 by initiating the next pulse T1 which opens gate circuit 24 permitting clock pulse 103 to pass therethrough to set multivibrator 22. As long as gate circuit 25 remains closed by the positive voltage on gating lead 30 the pulse train provided by multivibrator 22 on output lead 23 is of the form shown by FIG. 2*e*. As it can be seen from FIG. 2*e*, the output signal comprises a negative going pulse having a duration of two-thirds of the period of device 16.

The output signal on lead 20 is also applied, via lead 31, to trigger the first one of a group of bistable devices such as self gated bistable multivibrators 32, 33, and 34. Bistable devices 32, 33 and 34 are arranged in sequence to divide the period of the trigger pulse T2 respectively by 2, 4, and 8 as is well understood in the art. Each of multivibrators 32, 33 and 34 have two output signals, which are complementary to one another.

The output voltage on output leads 35, 36 and 37 are respectively shown in FIGS. 2*f*, 2*g* and 2*h* in relation to trigger pulse T2 of FIG. 2*c*. The period of the output signal on lead 35 is equal to the period of trigger pulse T2, the period of the output signal on lead 36 is equal to twice the period of trigger pulse T2, and the output signal on lead 37 is equal to four times the period of trigger pulse T2. Since the period of trigger pulse T2 is equal to three times the clock pulse bit rate it is readily seen that the period of the output pulse on lead 37 is equal to twelve times the clock pulse bit rate.

The six output signals from binary devices 32, 33 and 34 are applied to one side of a coding matrix 40. A group of binary functions 41, 42, 43, 44, 45, 46, 47 and 48, shown only in block form, are connected to the other side of coding matrix 40. Each of the functions 41 to 48 are capable of providing a binary output signal indicative of its binary condition. Matrix 40 may be of any suitable type capable of the operation of sequentially connecting each function to the common matrix output terminal 30 in accordance with the state of binary devices 32, 33 and 34.

Matrix 40 constructed and operated on the following principles has been found particularly satisfactory. A plurality of diodes and resistive impedances are arranged in matrix form in rows and columns, with the connections thereto from functions 41 to 48 and from devices 32, 33 and 34 as shown. Matrix 40 operates so that when all the functions are in a selected binary state (normal), no operative output signal is produced on lead 30, but when one or more of the functions are in the nonselected binary state (abnormal), matrix 40 produces an operative negative output signal whose position in time relative to a cycle of the output pulse train indicates which of function 41–48 is abnormal. This action may be accomplished by utilizing the binary coding scheme set forth in the following table:

Binary Input

| Functions | Lead 35 | Lead 36 | Lead 37 |
|---|---|---|---|
| 41 | 1 | 1 | 1 |
| 42 | 0 | 1 | 1 |
| 43 | 1 | 0 | 1 |
| 44 | 0 | 0 | 1 |
| 45 | 1 | 1 | 0 |
| 46 | 0 | 1 | 0 |
| 47 | 1 | 0 | 0 |
| 48 | 0 | 0 | 0 |

In the above table, a binary 1 indicates a negative value, while a binary 0 indicates a less negative or positive value. A study of this table will show that for each of the eight function switches 15–22 there is a unique combination of three of the binary inputs on leads 35, 36 and 37 which are negative. For example, for switch 43 binary input leads 35 and 37 are negative and lead 36 is positive. The above relationships between the polarities of the different binary inputs and the different counter periods can be seen in the timing diagrams of FIGS. 2*f*, 2*g* and 2*h*, which show the unique combinations set out above.

When there is both a negative signal applied through any one of functions 41–48 and the unique combination of negative input signals on leads 35, 36 and 37 associate with that function, matrix 40 is operative to produce a negative output signal on its common output conductor 30. This signal is also referred to as the condition signal since it indicates the binary condition of a function. One method of producing the above described unique combinations of input signals is to utilize diodes which are selectively connected to the different functions and to the different binary inputs.

Thus, when binary device output leads 35 and 37 are negative and output lead 36 is positive, as they are only during the third trigger pulse T3 of a pulse train cycle, the diodes in the row representing function 43 all have negative voltages thereacross and are conductive. If, at the same time, the function 43 is abnormal the negative potential is applied through to this row of matrix 40 to produce a negative output signal (condition signal) on conductor 30. It will be understood that other diodes will be similarly disposed and connected in the other columns of the rows of the other function switches in accordance with the above stated code, and that a negative output will be produced from the matrix on conductor 40 when any function is abnormal and the binary input signals for that particular switch are all negative.

The matrix output lead 30, as has been stated hereinbefore, remains positive (or zero) as long as functions 41 to 48 have a selected or normal condition. As long as output lead 30 is positive, gating network 25 remains closed so that clock pulse 101 (the second clock pulse in any period) cannot pass to multivibrator 22 to reset it. Assuming that function 43 changes its condition thereby generating a negative voltage on lead 30 during the third period, the binary input signal on lead 35 is negative, the signal on lead 36 is positive, and the signal on lead 37 is negative.

This corresponds to the binary code of functions 43 so that a negative signal on lead 49 is transmitted to matrix common lead 30 which forms the second gating lead to gate circuit 25. Accordingly, when clock pulse 105 triggers pulse T2 during the third period, gate circuit 25 is open and clock pulse 105 is transmitted, via gate circuit 25, and OR circuit 28 as shown in FIG. 2*i*. This gate clock pulse is applied to the R terminal of output multivibrator 22 and resets multivibrator 22 causing a positive output voltage on lead 23. Timewise, this resetting of device 22 occurs at the beginning of the second one-third of the period.

An output pulse train showing a pulse corresponding to an abnormal condition of function 43 is depicted at 105' in FIG. 2*j* which clearly shows that the length of the negative pulse decreased from the first two-thirds of the period to the first one-third of the period. In other words, a change of condition of one of the functions is encoded upon the pulse train by decreasing the width of the negative going pulse by one-half.

The length of the pulse train necessary to interrogate all functions 41 to 48 constitutes a frame or a cycle. For eight functions to be interrogated trinary counter 16 has to cycle through 8 times so that a cycle has a length equal to eight periods. For recovering the coded information, it is essential that the end or the beginning of cycle be coded upon the output pulse train so that proper synchronization between coding and decoding may be had.

The method of indicating the end of a cycle utilized in here is to permit the output pulse on output lead 23 to remain positive for the period of one clock pulse bit after the end of the eighth period as shown in 106 in FIG. 2*e*.

To provide the additional positive pulse 106 lasting for one-third of a normal period, gate circuit 14 is closed at the end of the eighth period for a time equal to one clock bit time so that device 16 receives no actuating pulse to advance it. Gate circuit 14 is closed by applying a positive cycle pulse as will now be described.

A five-input gating circuit 50 is provided which has applied thereto four gating signals and a set signal. The set signal is a clock pulse applied to gate circuit 50 through set lead 51. When gate circuit 50 is open the gated clock pulse, also referred to as the cycle gated clock pulse, is applied to the S terminal of a bistable multivibrator 52 having gating lead 15 directly connected to the output terminal which goes positive when multivibrator 52 is set. The positive signal closes cycle gate circuit 14.

Since it is desired to close cycle gate circuit 14 at the ends of the eighth period and since the eighth period is the only period at which binary leads 35, 36 and 37 are positive, and its complementary output leads are negative, these negative signals may be utilized to indicate the eighth period. Consequently, these binary signals are connected, via leads 53, 54 and 55, to gate circuit 50 and operate as gating signals. Also applied to gate circuit 50 is output pulse T2 as the fourth gating signal, via lead 56, so that gate circuit 50 is opened during the eighth period at the time of occurrence of the second clock pulse as shown at 108, FIGS. 2*a* and 2*k*.

Accordingly, gated clock pulse 108 passes through gating circuit 50 to set multivibrator 52 and to thereby provide a positive output voltage on lead 15 as shown at 109 in FIG. 2*l* which closes gate circuit 14 and prevents clock pulse 110 from advancing ring counter 16.

To reset bistable multivibrator 52 its high output terminal is connected, via gating lead 57, to a gating circuit 58 which is connected to gate the clock pulses via lead 59. As gating lead 15 becomes positive, gating lead 57 becomes negative thereby opening gate circuit 58 to pass clock pulse 110, via reset lead 60 to trigger multivibrator 52. Clock pulse 110 resets multivibrator 52 thereby opening gate circuit 14 to pass pulse 111 to initiate the next cycle.

Even though the encoding system of this invention has been explained in connection with a tristable counter 16 for encoding the binary condition of eight functions, it is to be understood that the encoder system of this invention may be extended to interrogate a much larger number of functions. Furthermore, the encoder system of this invention may also be utilized to provide a code representing not only binary but also trinary, quaternary and higher order conditions of functions.

Encoding the binary condition of a greater number of functions is implemented by enlarging the matrix from 8 to say 16, 32, 64, 128, etc. Enlarging the matrix requires additional self-gated multivibrator such as 34, to be sequentially added as well known in the art. To increase the number of functions to be encoded to 16 requires one additional self-gated multivibrator with a larger matrix. For each additional bistable multivibrator added to the matrix, one additional output lead must be connected to provide a gating signal to gate circuit 50 so that the end of a cycle may be uniquely determined.

As already stated, the encoding system of this invention may also be utilized to encode plural conditions of functions. Basically, when encoding plural conditions the period is increased from three clock pulse bits to four for a trinary condition function and to five quaternary condition functions. The first clock pulse bit is always utilized to indicate the beginning of a period and the last clock pulse bit to indicate one condition and to return the output coded pulse to zero at the end of a period. One additional clock bit is needed for each plural condition over one, i.e., one additional bit for binary conditions and 3 additional bits quaternary condition.

Sampling for higher order than binary conditions may be provided by the basic system described herein to determine periods and end of a cycle, and utilizing suborder matrices with each function which are synchronized with the appropriate output pulse T in a subsequence.

There has been described a time-division multiplex coding system for encoding the conditions of a plurality of functions to derive an encoded pulse train. The timing reference is supplied by a clock which generates codes exactly one-third and two-thirds of a period without the use of additional time sensitive networks. The coding system provides the largest possible discrimination with a return-to-zero constant rate code for a given bandwidth.

What is claimed is:

1. A time division multiplex encoder for sequentially encoding the condition of a plurality of functions upon a pulse train, said encoder comprising:

clock means for generating timing pulses;

ring counter means of $n$ stages responsive to said timing pulses and operative to provide an output signal for each stage having a period of $n$ timing pulses;

sequentially advancing interrogation means responsive to all but the first and the last of said output signals for sequentially interrogating each of said plurality of functions, a different function being associated with a different period of said last named output signals, said interrogation means being operative to provide a condition signal for each output signal which corresponds to the condition of the function interrogated;

first gating means responsive to the first of said output signals for gating said timing pulses to provide a first trigger signal;

second gating means responsive to the last of said output signals for gating said timing pulses to provide a last trigger signal;

further gating means each responsive to one of the remaining of said output signals and the associated condition signals for gating said timing pulses to provide further trigger signals; and bistable output means having a set and reset input terminal, said first trigger signal being applied to one of said input terminals and all other trigger signals being applied to the other of said input terminals.

2. A time division multiplex encoder for sequentially encoding the binary condition of a plurality of functions, said encoder comprising:

clock means generating timing pulses;

trinary counter means advanced by said timing pulses and operative to provide sequentially provide a first, second, and third output signal, the period of each output signal corresponding to three timing pulses;

interrogation means responsive to a selected one of said output signals for sequentially interrogating each of said plurality of functions, a different function being associated with a different period of said output signal, said interrogation means being operative to provide a condition signal corresponding to the binary condition of the function interrogated;

first gating means responsive to said first output signal for gating said timing pulses to provide a first trigger signal;

second gating means responsive to said second output signal and to said condition signal for gating said timing pulses to provide a second trigger signal;

third gating means responsive to said third output signal for gating said timing pulses to provide a third gating signal; and bistable output means, said first trigger signal being connected to said output means to turn the same on and the second and third trigger signal being connected to said output means to turn the same off.

3. A time division multiplex encoder for sequentially encoding the binary condition of a plurality of functions, said encoder comprising:

a clock for generating timing pulses;

trinary counter means responsive to said timing pulses and operative to provide a first, second, and third output signal, the period of each output signal corresponding to three timing pulses and the output pulses of said first, second and third output signal being displaced by one timing pulse and having a width equal to one-third of said period;

interrogation means responsive to said second output signals for sequentially interrogating each of said plurality of functions, a different function being associated with a different period of said second output signal, said interrogation means being operative to derive a condition signal corresponding to the binary condition of the function interrogated;

a first gating circuit responsive to said first output signal for gating said timing pulses to provide a first trigger signal;

a second gating circuit responsive to said second output signal and to said condition signal for gating said timing pulses to provide a second trigger signal;

a third gating circuit responsive to said third output signal for gating said timing pulses to provide a third gating signal; and a bistable output device for providing a coded output pulse train indicative of the condition of each function, said first trigger signal being applied to turn on said device to indicate the commencement of a new period, said second trigger signal being applied to turn off said output device for one of the binary conditions of the function associated with the period and to leave said output device on for the other of the binary conditions, and said third trigger signal being applied to turn said output device off in any case for the last one-third of the period.

4. A time division multiplex encoder for sequentially encoding the condition of a plurality of functions, said encoder comprising:

clock means for generating a train of equal-spaced timing pulses;

cycle gating circuit means responsive to a cycle signal for gating said timing pulses to provide cycle gated timing pulses;

trinary counter means responsive to said cycle gated timing pulses and operative to provide a first, second, and third output signal, the period of each output signal corresponding to three timing pulses and the output pulses of said first, second and third output signal being displaced by one timing pulse and having a width equal to one-third of said period;

interrogation means responsive to a selected one of said output signals for sequentially interrogating each of said plurality of functions, a different function being associated with a different period of said selected output signal, said interrogation means being operative to provide a condition signal corresponding to the binary condition of the function interrogated and said cycle signal at the completion of a sequence of interrogation;

a first gating circuit responsive to said first output signal for gating said timing pulses to provide a first trigger signal;

a second gating circuit responsive to said second output signal and to said condition signal for gating said timing pulses to provide a second trigger signal;

a third gating circuit responsive to said third output signal for gating said timing pulses to provide a third gating signal; and bistable output means having a set and a reset input terminal, said first trigger signal being applied to one of said input terminals and said second and third trigger signal both being applied to the other of said input terminals whereby said first trigger signal initiates one condition of said output means indicating the commencement of a new period, said second trigger signal initiates the other condition of said output means for one condition of the function associated with the period and said third trigger signal initiates the other condition of said output means in any case during the last one-third of the period to indicate the end of the period.

5. A time division multiplex encoder for sequentially encoding the binary condition of a plurality of functions, said encoder comprising:

a clock for generating a train of square-wave timing pulses;

cycle gating circuit means responsive to a cycle signal for gating said timing pulses to provide cycle gated timing pulses;

trinary counter means responsive to said cycle gated timing pulses and operative to provide a first, second, and third output signal, the period of each output signal being equal to three timing pulses and the output pulses of said first, second and third output signal being displaced by one timing pulse with respect to one another and having a width equal to one-third of said period;

interrogating means responsive to a selected one of said output signals for sequentially interrogating each of said plurality of functions, a different function being associated with a different period of said output signals, said interrogation means being operative to provide a condition signal corresponding to the binary condition of the function interrogated and the said cycle signal at the completion of a sequence of interrogating;

first gating circuit means responsive to said first output signal for gating said timing signals to provide a first trigger signal;

second gating circuit means responsive to said second output signal and to said condition signal for gating said timing signal to provide a second trigger signal;

a third gating circuit responsive to said third output signal for gating said timing pulses to provide a third gating signal; and a bistable output device for providing a coded pulse train in which the state of said output device during the center one-third period indicates the binary condition of the function during an associated period, said output device being triggered to one state by said first trigger signal at the commencement of a period and being triggered to the other state by said third trigger signal at the commencement of the last one-third of the period, the state of said output device during the center one-third period being controlled by said second trigger signal.

6. An encoding system for providing a pulse train having sequentially encoded thereon the conditions of a plurality of functions such that each period of said pulse train is associated with a different function, said encoder comprising:

clock means for generating a timing signal having *n* bits per period of said pulse train where *n* is equal to one plus the total number of possible different conditions of the functions to be encoded;

pulse train period means responsive to said timing signal and operative to derive a start period signal from the first of said *n* bits per period, a stop period signal from the last of said *n* per period, and a different code period signal for each of the remaining *n* bits per period;

function interrogating means responsive to a selected one of said period signals and operative to sequentially interrogate each of said functions and to derive *n*-2 function condition signals indicative of the condition of the function associated with the period of interrogation;

pulse train generating means responsive to said start, stop and code period signals and operative to be turned on by said start period signals and to be turned off by said code and stop period signals; and function condition means responsive to said code period signals and said function condition signals and operative to disable said code period signal from turning off said pulse train generating means when the function condition signal corresponds to a selected condition of the function associated with the period of interrogation.

7. An encoding system for providing a pulse train having sequentially and cyclicly encoded thereon the conditions of a plurality of functions such that each period within one cycle of said pulse train is associated with a different function, said encoder comprising:

clock means for generating a timing signal having *n* bits per period of said pulse train where *n* is equal to one plus the total number of possible different conditions of the functions to be encoded;

pulse train period means responsive to said timing signal and operative to derive a start period signal from the first said *n* bits per period, a stop period signal from the last of said *n* per period, and a different code period signal for each of the remaining *n* bits per period;

function interrogating means responsive to a selected one of said period signals and operative to sequentially interrogate each of said functions and to derive *n*-2 function condition signals indicative of the condition of the function associated with the period of interrogation;

pulse train cycle means responsive to said function interrogating means and operative to develop a cycle signal at the end of a completed sequence of interrogation of said plurality of functions;

pulse train generating means responsive to said start, stop and code period signals and operative to be turned on by said start period signals and to be turned off by said code and stop period signals;

function condition means responsive to said code period signals and said function condition signals and operative to disable said code period signal from turning off said pulse train generating means when the function condition signal corresponds to a selected condition of the function associated with the period of interrogation; and disabling means responsive to said cycle signal and operative to disable said pulse train period means for a time corresponding to a selected number of bits of said timing signal to indicate the end of a pulse train cycle.

8. An encoding system for providing a pulse train having sequentially encoded thereon the conditions of a plurality of functions such that each period of said pulse train is associated with a different function, said encoder comprising:

clock means for generating a timing signal having 3 bits per period of said pulse train;

pulse train period means responsive to said timing signal and operative to derive a start, a code and a stop period signal from the first, second and third bit per period, respectively;

function interrogating means responsive to a selected one of said period signals and operative to sequentially interrogate each of said functions and to derive a function condition signal indicative of the condition of the function associated with the period of interrogation;

pulse train generating means responsive to said start, stop and code period signals and operative to be turned on by said start period signals and to be turned off by said code and stop period signals; and function condition means responsive to said code period signals and said function condition signals and operative to disable said code period signal from turning off said pulse train generating means when the function condition signal corresponds to a selected condition of the function associated with the period of interrogation.

9. An encoding system for providing a pulse train having sequentially and cyclicly encoded thereon the conditions of a plurality of functions such that each period within one cycle of said pulse train is associated with a different function, said encoder comprising:

clock means for generating a timing signal having 3 bits per period of said pulse train;

pulse train period means responsive to said timing signal and operative to derive a start, a code and a stop period signal from the first, second and third bit per period, respectively;

function interrogating means responsive to a selected one of said period signals and operative to sequentially interrogate each of said functions and to derive a function condition signal indicative of the condition of the function associated with the period of interrogation;

pulse train cycle means responsive to said function interrogating means and operative to develop a cycle signal at the end of a completed sequence of interrogation of said plurality of functions;

pulse train generating means responsive to said start, stop and code period signals and operative to be turned on by said start period signals and to be turned by said code and stop period signals;

function condition means responsive to said code period signals and said function condition signals and operative to disable said code period signal from turning off said pulse train generating means when the function condition signal corresponds to a selected condition of the function associated with the period of interrogation; and disabling means responsive to said cycle signal and operative to disable said pulse train period means for a time corresponding to a selected number of bits of said timing signal to indicate the end of a pulse train cycle.

10. An encoding system for providing a pulse train having sequentially and cylicly encoded thereon the conditions of a plurality of functions such that each period within one cycle of said pulse train is associated with a different function, said encoder comprising:

clock means for generating a timing signal having 3 bits per period of said pulse train;

pulse train period means responsive to said timing signal and operative to derive a start, a code and a stop period signal from the first, second and third bit per period, respectively;

function interrogating means responsive to a selected one of said period signals and operative to sequentially interrogate each of said functions and to derive a function condition signal indicative of the condition of the function associated with the period of interrogation;

pulse train cycle means responsive to said function interrogating means and one of said period signals and operative to develop a cycle signal at the end of a completed sequence of interrogation of said plurality of functions and at a predetermined portion of the last period of the pulse train cycle;

pulse train generating means responsive to said start, stop and code period signals and operative to be turned on by said start period signals and to be turned off by said code and stop period signals;

function condition means responsive to said code period signals and said function condition signals and operative to disable said code period signals from turning off said pulse train generating means when the function condition signal corresponds to a selected condition of the function associated with the period of interrogation; and disabling means responsive to said cycle signal and operative to disable said pulse train period means for a time corresponding to a selected number of bits of said timing signal to indicate the end of a pulse train cycle.

11. An encoding system for providing a pulse train having sequentially and cyclicly encoded thereon the conditions of a plurality of functions such that each period within one cycle of said pulse train is associated with a different function, said encoder comprising:

clock means for generating a timing signal having 3 bits per period of said pulse train;

pulse train period means responsive to a gated timing signal and operative to derive a start, a code and a stop period signal from the first, second and third bit per period, respectively;

function interrogating means responsive to one of said period signals and operative to sequentially interrogate each of said functions and to derive a function condition signal indicative of the condition of the function associated with the period of interrogation and a cycle signal at the end of a complete sequence of interrogating;

first gating means responsive to said cycle signal and a selected one of said period signals for gating said timing signal and for providing a gated cycle signal at a predetermined portion of the last period marking the end of a completed sequence of interrogation of said plurality of functions;

pulse train generating means responsive to said start and stop period signals and gated code period signals and operative to be turned on by said start period signals and to be turned off by said gated code and stop period signals;

second gating means responsive to said function condition signal for gating said code period signal and for providing said gated code period signal if and only if the condition signal corresponds to a selected condition of the function associated with the period of interrogation;

a bistable means responsive to said gated cycle signal and a reset signal and operative to provide a gating signal and the complement of said gating signal upon the occurrence of said gated cycle signal;

third gating means responsive to said gating signal for gating said timing signal and for providing said gated timing signal; and fourth gating means responsive to the complement of said gating signal for gating said timing signal and for providing said reset signal to reset said bistable means.

References Cited by the Examiner

UNITED STATES PATENTS

| | | | |
|---|---|---|---|
| 2,680,240 | 6/1954 | Greenfield | 340—150 X |
| 3,045,210 | 7/1962 | Langley | 340—151 X |
| 3,047,845 | 7/1962 | Hansson | 340—184 |

NEIL C. READ, *Primary Examiner.*

L. A. HOFFMAN, A. J. KASPER, *Assistant Examiners.*